United States Patent [11] 3,609,195

[72] Inventor Ellis K. Fields
 Chicago, Ill.
[21] Appl. No. 815,201
[22] Filed Apr. 10, 1969
[45] Patented Sept. 28, 1971
[73] Assignee Standard Oil Company
 Chicago, Ill.
 Continuation-in-part of application Ser. No. 597,869, Nov. 30, 1966, now abandoned.

[54] PREPARATION OF AROMATIC ALDEHYDES BY OXIDATION
 3 Claims, No Drawings
[52] U.S. Cl..................................................... 260/599,
 260/621 G, 260/346.2 M, 260/645, 260/623 R, 260/473 R
[51] Int. Cl....................................................... C07c 47/52
[50] Field of Search.......................................... 260/621 G, 599

[56] References Cited
UNITED STATES PATENTS
1,547,725 6/1923 Bibb............................ 260/621
1,909,354 5/1933 Jaeger......................... 260/599
1,909,355 5/1933 Jaeger......................... 260/599

Primary Examiner—Bernard Helfin
Attorneys—Arthur G. Gilkes, William T. McClain and Gunar J. Blumberg ABSTRACT: A process for preparing aromatic aldehydes which process consists of oxidizing substituted or unsubstituted toluene, xylene, pseudocumene with a molecular oxygen-containing gas in the presence of 0.1 to 25 moles of nitrobenzene.

3,609,195

PREPARATION OF AROMATIC ALDEHYDES BY OXIDATION

This is a continuation-in-part of Ser. No. 597,869 filed Nov. 30, 1966 and now abandoned by the same inventor.

This invention relates to the oxidation of aromatics and particularly relates to the oxidation in the vapor phase, with molecular oxygen-containing gas, aromatic compounds in the presence of one of the following nitrocompounds; nitrobenzene, nitrotoluene, nitroxylene, or a mixture of these to produce aromatic aldehydes.

The vapor-phase oxidation of aromatic compounds, more particularly methylbenzenes, has been unattractive in the past because of low conversions. In the prior art attempts at higher conversions have caused extensive oxidation of the aromatic compounds to carbon dioxide and water. This is also true when oxidation is carried out in the presence of metal and metal oxide catalysts.

I have discovered that aromatic compounds can be oxidized in the vapor phase with a molecular oxygen-containing gas in the presence of nitrobenzene, nitrotoluene, nitroxylene or a mixture of these, to give good yields of aromatic aldehydes. For example, when toluene is oxidized in the vapor phase by air or oxygen in the presence of nitrobenzene good yields of benzaldehyde are obtained. Good yields of aromatic aldehydes are obtained when methylated benzenes and other aromatic compounds are oxidized according to my process. Substituted or unsubstituted toluenes, xylenes and pseudocumenes can be oxidized by the process of my invention. Representative compounds which can be oxidized include benzene, toluene, ortho-xylene, meta-xylene, para-xylene, pseudocumene, hemimellitene, mesitylene, durene, isodurene, prehnitene, pentamethylbenzene, naphthalene, 1- and 2-methylnaphthalenes, dimethyl naphthalenes, acenaphthene, phenanthrene, anthracenes, pyrene, and other polycyclic aromatics; also all these aromatic compounds containing substituents such as fluoro, chloro, bromo, nitrile, carboxy, ester, anhydride and trifluoromethyl groups. Examples of substituted aromatic compounds include dimethyl isophthalate, dimethyl phthalate, phthalic anhydride and benzotrifluoride.

In general, the process is carried out by oxidizing the aromatic compounds in the vapor phase by air- or oxygen-enriched air at about 0.1 to 10 atmospheres pressure. The contact time can vary from about 0.1 to 60 seconds. The temperature generally is maintained in the range of 500°–650° C. and the reaction is carried out in the presence of 0.1 to 25 mole percent of nitrobenzene, nitrotoluene, or nitroxylene. In the preferred process the air or molecular oxygen-containing gas is maintained at 1 atmosphere pressure and a flow rate of 0.6 to 1 cubic foot per hour, giving a contact time of 2–15 seconds. The preferred temperature is 550°–650° C. and the concentration of nitrobenzene is maintained at 1–7 mole percent. The preferred aromatic hydrocarbons are toluene, xylene and pseudocumene. My oxidation process can conveniently be run in a reactor consisting of a tube of some inert material, preferably Vycor, quartz, or Pyrex and which may be packed with beads or chips of the same material.

The aromatic aldehydes are useful as pesticides, as dyes, as chemical intermediates, resins and plastics, antioxidants and pharmaceuticals. The aromatic aldehydes are particularly useful for preparing resins and plastics. They are also useful as pesticides and pharmaceuticals.

The following examples are included as illustrations of my process and are not intended as limitations thereof:

EXAMPLE I

A solution of toluene (92 g., 1 mole) and nitrobenzene (1.23 g., 0.01 moles) was passed through a Vycor tube filled with Vycor chips at 600° C. with an airflow of 0.8 cubic feet per hour. The reaction time was 7 hours 5 minutes with a contact time of 4.7 seconds. The reaction products were condensed in a series of three trops at dry-ice temperature. Distillation of the reaction mixture afforded 63.7 g. toluene and a residue of 23.7 g. The percent conversion of nitrobenzene was 46 percent. Analysis of the residue by gas chromatography showed it to contain 9.81 g. toluene along with the following oxidation products:

| Product | Yield, mole % [a] |
| --- | --- |
| benzaldehyde | 24.0 |
| phenol | 10.0 |
| o-cresol | 0.6 |
| m, p-cresol | 5.2 |

[a] Yields based on 20.8 percent conversion of toluene

EXAMPLE II

A solution of toluene (92 g., 1 mole) and nitrobenzene (1.23 g., 0.01 moles) was passed through a Vycor tube filled with Vycor chips at 600° C. with an airflow of 0.1 cubic feet per hour. The reaction time was 3 hours 3 minutes with a contact time of 11.2 seconds. The reaction products were condensed in a series of three trops at dry-ice temperature. The reaction mixture was distilled to give 80.5 g. toluene and a residue of 9.5 g. The percent conversion of nitrobenzene was 51 percent. Gas chromatography analysis of the residue showed it to contain 3.65 g. toluene and the following oxidation products:

| Product | Yield, mole % [b] |
| --- | --- |
| benzaldehyde | 17.8 |
| phenol | 6.0 |
| o-cresol | 0.35 |
| m, p-cresol | 4.6 |

[b] Yields based on 8.5 percent conversion of toluene

EXAMPLE III

A solution of toluene (92 g., 1 mole) and nitrobenzene (1.23 g., 0.01 moles) was passed through a Vycor tube filled with Vycor chips at 650° C. with an airflow of 0.8 cubic feet per hour. The reaction time was 8 hours 10 minutes with a contact time of 4.6 seconds. The reaction products were condensed in a series of three trops at dry-ice temperature. The reaction mixture was distilled to give 48.9 g. toluene and a residue of 30.5 g. The percent conversion of nitrobenzene was 90 percent. Gas chromatography analysis of the residue showed it to contain 13.3 g. of toluene and the following oxidation products:

| Product | Yield, mole % [c] |
| --- | --- |
| benzaldehyde | 11.5 |
| phenol | 12.2 |
| o-cresol | 1.0 |
| m, p-cresol | 3.8 |

[c] Yields based on 32 percent conversion of toluene.

EXAMPLE IV

A solution of 2.054 ml. (0.02 mole, 2 mole percent) of nitrobenzene in 88.88 ml. (1 mole) of benzene was oxidized in a Vycor tube at 600° C. with air at 0.6 cubic feet per hour over 311 minutes. Contact time was 8.06 seconds. The effluent was collected in a chilled receiver and the unreacted benzene was distilled to a pot temperature of 113° C. The residue contained 6.085 g. of phenol and 0.605 g. of dibenzofuran. Dibenzofuran is formed from phenol at elevated temperatures.

EXAMPLE V

To demonstrate clearly the effect of the nitrobenzene in the practice of my invention, the oxidation of 1 mole of benzene was repeated exactly as in example IV, but the nitrobenzene was omitted. The distillation residue contained 1.41 g. of phenol and 0.0078 g. of dibenzofuran: only about one-fifth as much phenol had formed in the absence of nitrobenzene.

EXAMPLE VI

The oxidation of 1 mole of benzene containing 2 mole percent of nitrobenzene containing 2 mole percent of nitrobenzene was repeated in example IV, using an airflow rate of 0.9 cubic feet per hour and a contact time of 4 seconds. The weight of phenol formed was 6.3 g., and dibenzofuran, 0.818 g. EXAMPLE VII The oxidation of 1 mole of benzene was repeated exactly as in example VI, without nitrobenzene. The weight of phenol was 0.7 g., and that of dibenzofuran, 0.034 g.

EXAMPLE VIII

The oxidation of benzene containing 2 mole percent of nitrobenzene was repeated as in example IV, using an airflow of 1.2 cubic feet per hour and a contact time of 3.3 seconds, to give 4.8 g. of phenol and 0.76 g. of dibenzofuran.

EXAMPLE IX

The oxidation of 1 mole of benzene was repeated exactly as in example VIII, without nitrobenzene. No phenol was formed, and only a trace (less than 0.01 g.) of dibenzofuran.

EXAMPLE X

To show that nitrobenzene formed in situ is also effective in the oxidation of benzene to phenol, the oxidation of 1 mole of benzene containing 2 mole percent of 70 percent nitric acid was repeated as in example VI, to give 3.26 g. of phenol and 0.5 g. of dibenzofuran.

EXAMPLE XI

The oxidation of example X was repeated, using 4 mole percent of 70 percent nitric acid to give 4.34 g. of phenol and 0.66 g. of dibenzofuran.

EXAMPLE XII

At 400° C. the yield of phenol is appreciably reduced, as shown by repeating the oxidation of 1 mole of benzene as in example X, but at 400° C. to give 0.416 g. of phenol and 0.136 g. of dibenzofuran.

EXAMPLE XIII

Chlorobenzene, 101.7 ml., 1 mole, containing 5.035 ml. (0.05 mole, 5 mole percent) of nitrobenzene, was oxidized at 600° C. with air at 0.6 cubic feet per hour over 115 minutes and a contact time of 6.0 seconds to give 4.30 g. chlorophenol and 2.40 g. dichlorodibenzofuran.

EXAMPLE XIV

The oxidation of 1 mole of chlorobenzene was repeated exactly as in example XIII without nitrobenzene to give 1.5 g. of chlorophenol and 0.45 g. of dichlorodibenzofuran.

EXAMPLE XV

1-Chloronaphthalene, 162.6 ml., 1 mole, containing 10.27 ml. (0.1 mole, 10 mole percent) was oxidized at 600° C. with air at 0.6 cubic feet per hour, contact time 6.3 seconds, to give 4.1 g. chloronaphthol and 4.2 g. dichlorodinaphthofuran.

EXAMPLE XVI

The oxidation of 1 mole of chloronaphthalene was repeated exactly as in example XV to give 0.36 g. of chloronaphthol and 0.416 g. of dichlorodinaphthofuran.

EXAMPLE XVII

A solution of 2.054 ml. (0.02 mole, 2 mole percent) of nitrobenzene in 106.4 ml. (1 mole) of toluene was oxidized at 600° C. with air at 0.3 cubic feet per hour over 342 minutes, contact time 9.8 seconds, to give a mixture of benzaldehyde and cresols that analyzed:

| | |
|---|---|
| benzaldehyde | 3.0 g. |
| o-cresol | 2.6 g. |
| m- + p-cresol | 1.3 g. |

EXAMPLE XVIII

Oxidation of 1 mole of toluene exactly as in example XVII without nitrobenzene gave a mixture that analyzed:

| | |
|---|---|
| benzaldehyde | 0.06 g. |
| o-cresol | 0.01 g. |
| m- + p-cresol | 0.01 g. |

EXAMPLE XIX

Oxidation of 1 mole of o-xylene containing 2 mole percent of nitrobenzene at 600° C. with air at 0.3 cubic feet per hour, contact time 10.0 seconds, gave 4.8 g. of o-tolualdehyde and 2.0 g. of o-xylenol.

EXAMPLE XX

Oxidation of 1 mole of o-xylene exactly as in example XIX, but without nitrobenzene gave 0.28 g. o-tolualdehyde and 0.46 g. o-xylenol.

EXAMPLE XXI

Oxidation of 1 mole of m-xylene containing 2 mole percent of nitrobenzene at 600° C. with air at 0.3 cubic feet per hour, contact time 10.0 seconds, gave 3.2 g. of m-tolualdehyde and 3.8 g. of m-xylenol.

EXAMPLE XXII

Oxidation of 1 mole of m-xylene as in example XXI, but without nitrobenzene gave 0.84 g. of m-tolualdehyde and 1.12 g. of m-xylenol.

EXAMPLE XXIII

Oxidation of 1 mole of p-xylene containing 2 mole percent of nitrobenzene at 600° C. with air at 0.3 cubic feet per hour, contact time 10 seconds, gave 4.0 g. of p-tolualdehyde and 2.2 g. of p-xylenol.

EXAMPLE XXIV

Oxidation of 1 mole of p-xylene as in example XXIII but without nitrobenzene gave 0.04 g. of p-tolualdehyde and 0.04 g. of p-xylenol.

EXAMPLE XXV

A solution of 1.027 ml. (0.01 mole, 2 mole percent) of nitrobenzene in 69 ml. (0.5 mole) of pseudocumene was oxidized at 600° C. with air at 0.3 cubic feet per hour over 208 minutes, contact time 10 seconds, to give 5.68 g. of dimethyl benzaldehyde and 1.08 g. of trimethyl phenol.

EXAMPLE XXVI

Oxidation of 0.5 mole of pseudocumene as in example XXV without nitrobenzene gave 0.86 g. of dimethyl benzaldehyde and 0.17 g. of trimethyl phenol.

EXAMPLE XXVII

A solution of 5.135 ml. (0.05 mole, 5 mole percent) of nitrobenzene in 92.9 ml. (1 mole) of fluorobenzene was oxidized at 600° C. with air at 0.6 cubic feet per hour over 97 minutes, contact time 6.4 seconds, to give 5.5 g. of fluorophenol and 0.22 g. of difluorodibenzofuran.

EXAMPLE XXVIII

Oxidation of 1 mole of fluorobenzene as in example XXVII, but without nitrobenzene gave 1.5 g. of fluorophenol and 0.09 g. of difluorodibenzofuran.

EXAMPLE XXIX

A solution of 1.027 ml. (0.01 mole, 5 mole percent) of nitrobenzene in 25.06 ml. (0.2 mole) of methyl benzoate was oxidized at 600° C. with air at 0.6 cubic feet per hour over 124 minutes, contact time 12.4 seconds, to give 0.525 g. of methyl hydroxybenzoate and 0.517 g. of methyl dihydroxybenzoate.

EXAMPLE XXX

Oxidation of 0.2 mole of methylbenzoate as in example XXIX, but without nitrobenzene gave 0.197 g. of methyl hydroxybenzoate and 0.287 g. of methyl dihydroxybenzoate.

I claim:

1. A process for preparing aromatic aldehydes which process comprises oxidizing, with a molecular oxygen-containing gas, aromatic compounds selected from the group consisting of substituted or unsubstituted toluene, xylene and pseudocumene in the presence of 0.1 to 25 mole percent nitrobenzene at a pressure of about 0.1 to 10 atmospheres and contact times of about 0.1 to 60 seconds at an elevated temperature of about 500° to 650° C.

2. The process of claim 1 wherein the contact time is 2 to 15 seconds and the temperature is 550° to 650° C. and the concentration of nitrobenzene is 1 to 7 mole percent.

3. The process for preparing benzaldehyde which process comprises oxidizing toluene with a molecular oxygen-containing gas in the presence of 0.1 to 25 mole percent nitrobenzene at a pressure of about 0.1 to 10 atmospheres and contact times of about 0.1 to 60 seconds at an elevated temperature of about 500° to 600° C.